UNITED STATES PATENT OFFICE.

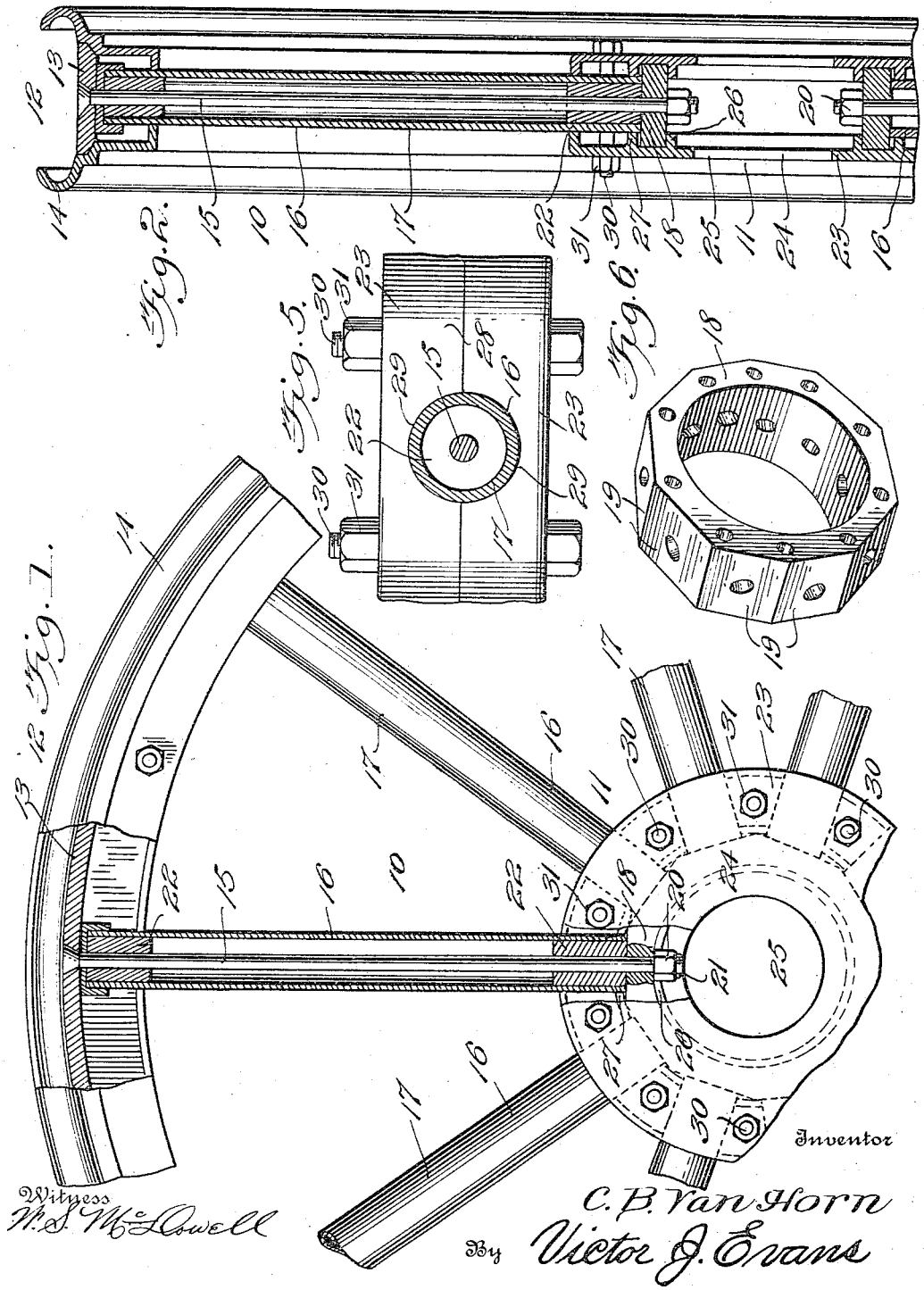

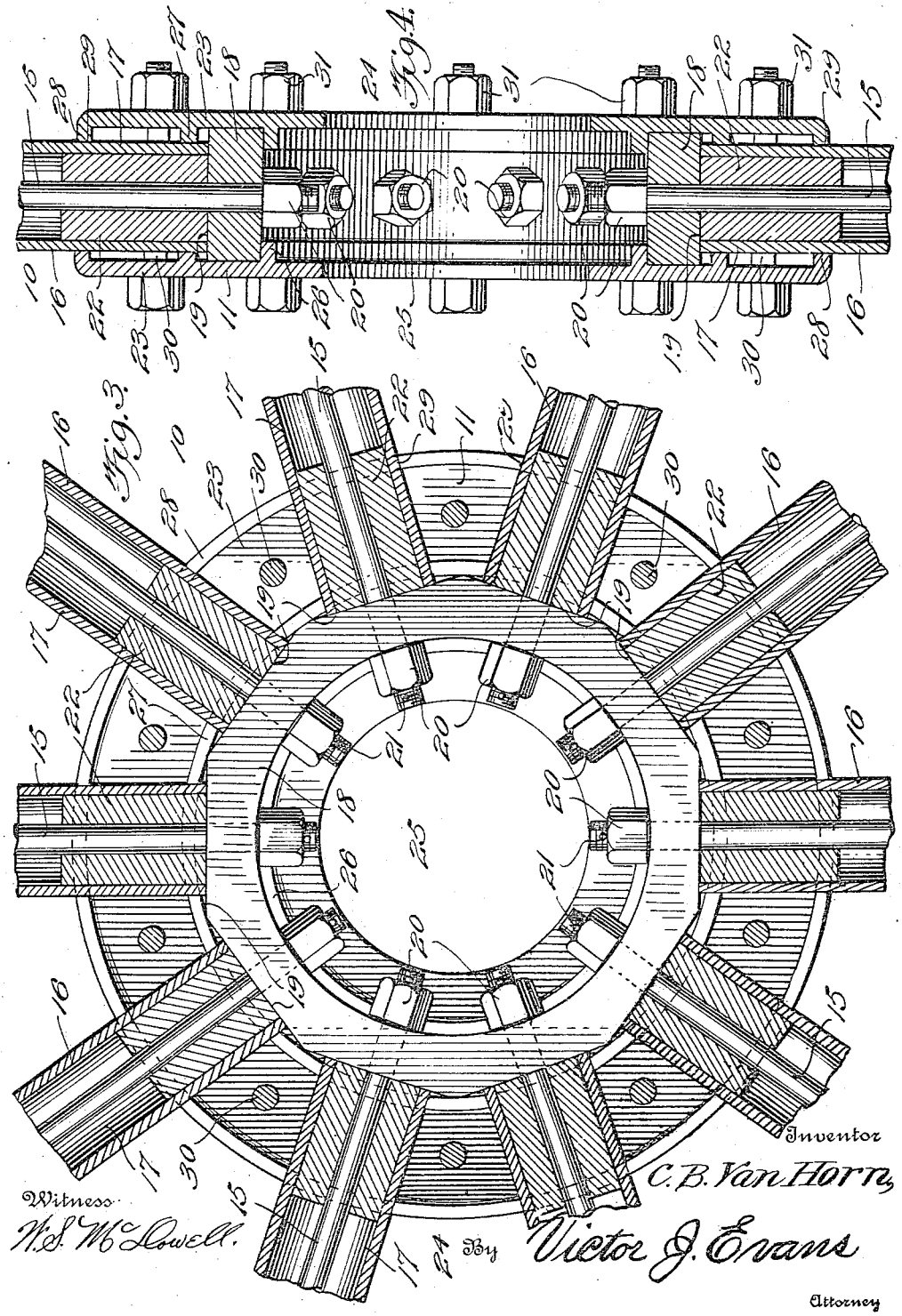

CHARLES B. VAN HORN, OF PHILADELPHIA, PENNSYLVANIA.

VEHICLE-WHEEL.

1,266,357.  Specification of Letters Patent.  Patented May 14, 1918.

Application filed May 19, 1916. Serial No. 98,584.

*To all whom it may concern:*

Be it known that I, CHARLES B. VAN HORN, a citizen of the United States, residing at Philadelphia, in the county of Philadelphia and State of Pennsylvania, have invented new and useful Improvements in Vehicle-Wheels, of which the following is a specification.

This invention relates to vehicle wheels and has for an object to provide a wheel of the above character with a metallic hub, the latter being so constructed as to permit the same to be associated or disassociated with the spoke structure of a wheel.

Another object is to provide a hub construction for vehicle wheels characterized by a substantial and durable formation and by the convenient and simple manner of assembling the same for operation; the hub is also formed to permit certain parts thereof to be easily removed so that the wheel will be capable of being readily repaired or adjusted within a minimum period of time.

Still further objects of the invention reside in a novel form and arrangement of vehicle wheel embodying details of construction involving improvements over the construction and arrangement of a wheel, for which a patent was granted to me January 28, 1908, No. 877617, in the United States, and further involving various improvements and structure which may or may not be used, as desired, in conjunction with the structure set forth in Patent No. 1,226,421, dated May 16, 1917, for a vehicle wheel.

In the further disclosure of the invention reference is to be had to the accompanying drawings, constituting a part of this specification, in which similar characters of reference denote corresponding parts in all the views, and in which, Figure 1 is a fragmentary side elevation of the wheel, parts being broken away to disclose the underlying structure, Fig. 2 is a fragmentary vertical transverse sectional view taken through the wheel, Fig. 3 is an enlarged sectional view taken through the hub formation, Fig. 4 is a vertical transverse sectional view taken through the hub formation, showing the same on an enlarged scale as in Fig. 3, Fig. 5 is a plan view of the hub showing one of the spokes in cross section.

Fig. 6 is a detail perspective view of the inner spoke or hub ring.

Referring to the drawings the wheel in its entirety is indicated by the numeral 10 and comprises a hub 11 and rim 12, the latter being clearly described in my prior patent above referred to and consisting of an external expansion and compression ring 13 seated upon side pieces 14 forming integral tire and felly portions with bolts 15 forming a spoke tensioned member passing through the external ring 13 and surrounded by tubular compression members 16, which with the bolts 15 form the spokes 17.

An inner spoke or hub ring 18 preferably has its periphery formed to provide flat faces 19 against which the inner ends of the tubular members 16 of the spokes 17 abut, and the spokes being arranged radially it will be clear that a flat face is provided for each spoke, the bolts 15 of the spokes passing through the ring 18 and having nuts 20 threaded on their inner projecting ends and locked by suitable cotter pins 21. The inner ends of the tubular portions 16 of the spokes have inserts or sleeves 22 therein through which the bolts 15 pass and these inserts also abut against the flat faces of the ring 18 as will be clearly seen by referring to the Figs. 3 and 4.

Side plates 23 are arranged in opposed relation to form sections of the hub body, indicated in its entirety by the numeral 24, and the side plates each consists of a flat plate like body formed with a central opening 25 and having an inwardly projecting annular rib 26 forming a seat for the ring 18, annular inwardly extending ribs 27 being also provided, one for each side plate, with each side plate furthermore having its peripheral edge extended inwardly to form an annular rib 28. When the side plates are arranged as shown in Fig. 4, it will be seen that the ribs 26 form the seats for the ring 18 and that the annular flanges or ribs 27, 28 abut against the tubular members 16 of the spokes 17, the inturned edges of the plates being formed with cut away portions 29 so that the said inturned edges will snugly fit around the tubular members of the spokes and otherwise have their similar edges abutting. Bolts 30 are disposed between adjacent spokes and pass transversely through the oppositely disposed side plates 23, the bolts having nuts 31 as shown in Fig. 4 and which when tightened up will bind the side plates rigidly in position and frictionally bind the annular ribs 27 and inturned edges 28 against the tubular members of the spokes and against each other to form a solid and well braced hub construction.

As mentioned heretofore, the particular hub formation described may be used in conjunction with my particular form of rim construction set forth herein and in detail disclosed in my prior patent referred to, but I desire it to be clearly understood that I do not limit myself particularly to this arrangement and that the hub construction set forth may be used with any desired form of rim construction that may be found to be practical to the end that the desired result may be obtained.

Having described my invention, what is claimed as new is,

1. In a vehicle wheel a hub body comprising an inner spoke ring, spokes radiating therefrom, side plates having edges fitting around said spokes and edges abutting against each other, projecting annular ribs on said side plates forming a seat for the ring, and annular inwardly projecting ribs on said side plates bearing against the peripheries of the spokes at their inner ends.

2. In a vehicle wheel, the combination of a rim, an outer spoke ring seated therein, a hub comprising oppositely located side plates having concentric ribs on their inner faces, an inner spoke ring held between said ribs, and spokes connecting said outer and inner spoke rings and each comprising a tubular compression member, and a tension member extending centrally and longitudinally through said compression member and having a positive connection at its outer and inner ends respectively with the outer and inner spoke rings.

3. In a vehicle wheel, the combination of a rim, an outer spoke ring seated therein, a hub comprising oppositely located side plates having concentric ribs on their inner faces, an inner spoke ring held between said ribs, and spokes connecting said outer and inner spoke rings and each comprising a tubular compression member, a tension member extending centrally and longitudinally through said compression member and having a positive connection at its outer and inner ends respectively with the outer and inner spoke rings, the inner end portions of the compression members being clamped between a plurality of said ribs on the hub plates.

4. In a vehicle wheel, the combination of a rim, an outer spoke ring seated therein, a hub comprising oppositely located side plates having concentric ribs on their inner faces, an inner spoke ring held between said ribs, and spokes connecting said outer and inner spoke rings and each comprising a tubular compression member, a tension member extending centrally and longitudinally through said compression member and having a positive connection at its outer and inner ends respectively with the outer and inner spoke rings, the inner end portions of the compression members being clamped between a plurality of said ribs on the hub plates, and tubular inserts surrounding said tension members and located within the outer and inner end portions of the compression members.

In testimony whereof I affix my signature in presence of a witness.

CHARLES B. VAN HORN.

Witness:
AMY B. HORN.

Copies of this patent may be obtained for five cents each, by addressing the "Commissioner of Patents, Washington, D. C."